April 19, 1927.

O. B. BLACKWELL ET AL 1,624,918

METHOD AND APPARATUS FOR TELEVISION

Filed May 7, 1925 4 Sheets-Sheet 3

INVENTORS
O.B.Blackwell & J.Herman
BY
ATTORNEY

April 19, 1927.                                                          1,624,918
                        O. B. BLACKWELL ET AL
                    METHOD AND APPARATUS FOR TELEVISION
                    Filed May 7, 1925          4 Sheets-Sheet 4

INVENTORS
O.B.Blackwell
J.Herman
BY
ATTORNEY

Patented Apr. 19, 1927.

1,624,918

UNITED STATES PATENT OFFICE.

OTTO B. BLACKWELL, OF PLANDOME, AND JOSEPH HERMAN, OF NEW YORK, N. Y., ASSIGNORS TO AMERICAN TELEPHONE AND TELEGRAPH COMPANY, A CORPORATION OF NEW YORK.

METHOD AND APPARATUS FOR TELEVISION.

Application filed May 7, 1925. Serial No. 28,702.

An object of our invention is to provide a new and improved system to enable a person to observe a view at a distance by means of electric currents or waves over an intervening medium, for example, a line wire. Another object of our invention is to provide a system of television with relatively sharp definition for a preferred part of the field of view. Another object of our invention is to throw on a screen before the observer an image of a distant view with maximum distinctness in a preferred part thereof. Another object of our invention is to utilize the available transmitting channel between the object viewed and the observer to the best advantage by transmitting the outlying parts of the view with comparative rapidity in relatively coarse detail and transmitting the central or preferred part with less rapidity and in finer detail. Another object of our invention relates to providing for shifting the detailed central part of the field of view to various parts of the object viewed, and still another object of our invention relates to means and methods for doing this controlled by the observer at the receiving end. All these and other objects of our invention will become apparent on consideration of a limited number of examples of the practice of the invention which we have chosen for disclosure in the following specification and the accompanying drawings. It will be understood that the following description relates to these particular embodiments of the invention and that the invention will be defined in the appended claims.

Figure 1:
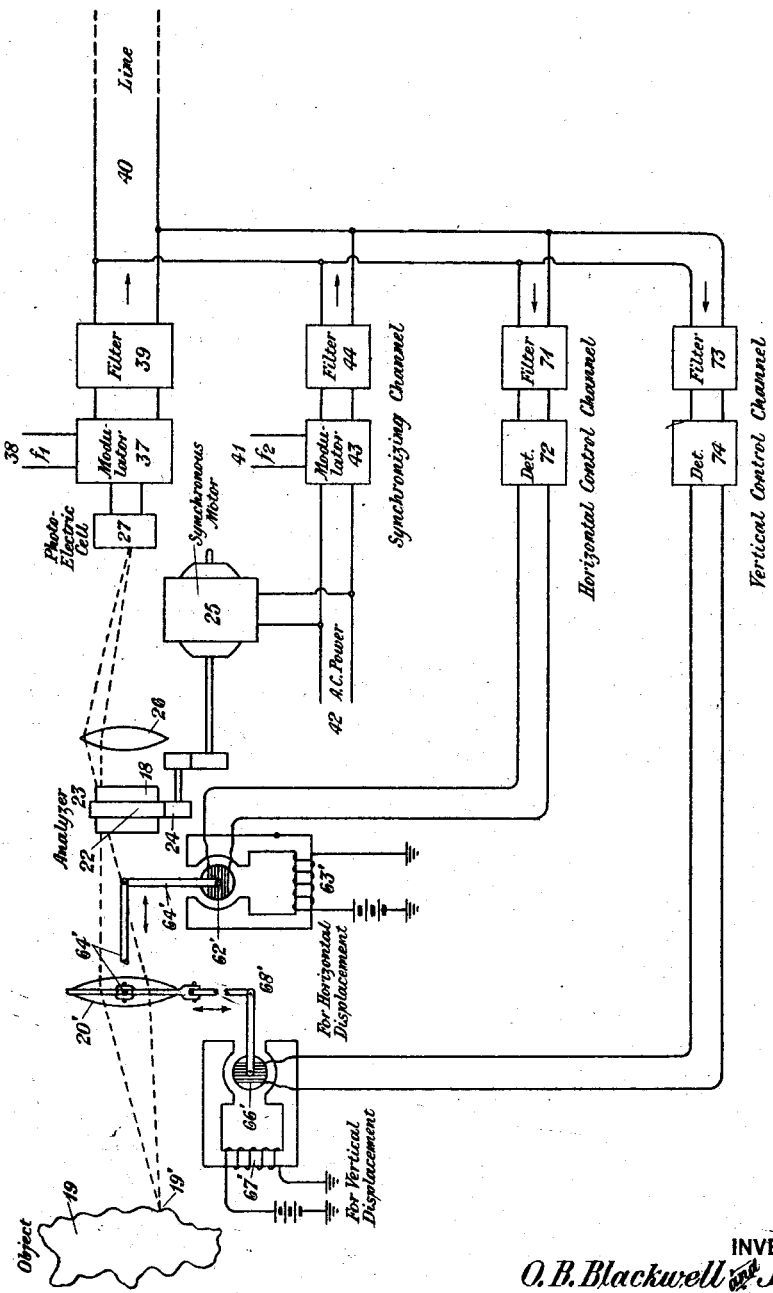
Figure 2:
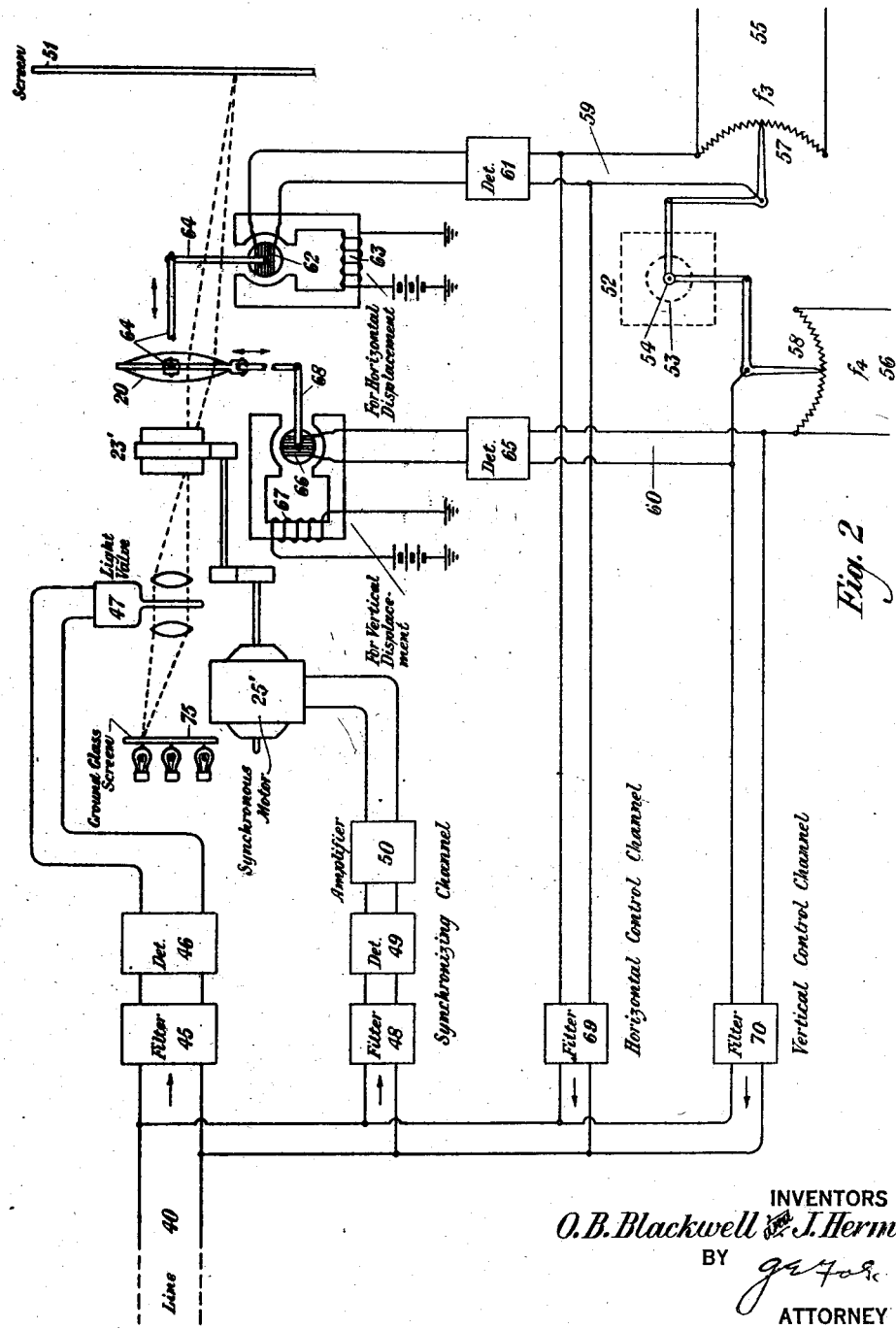
Figure 3:
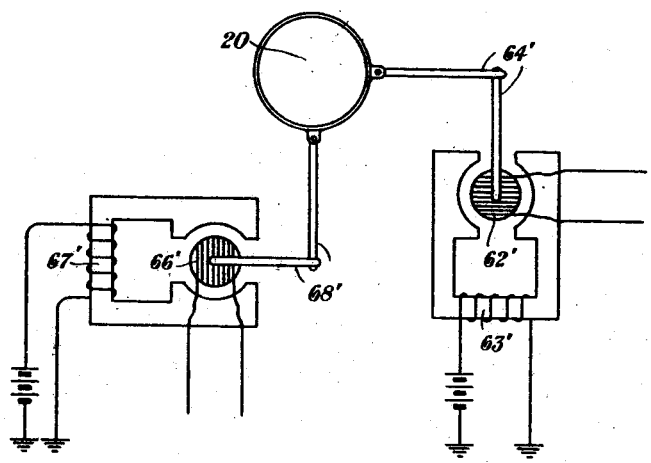
Figure 4:
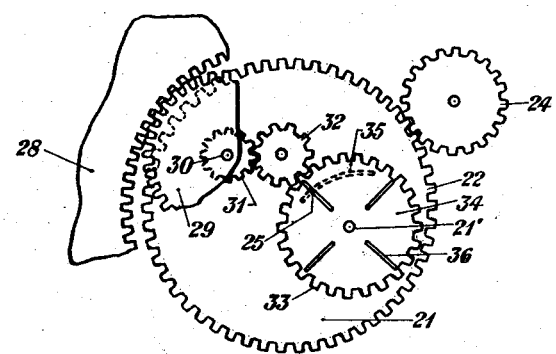
Figure 5:
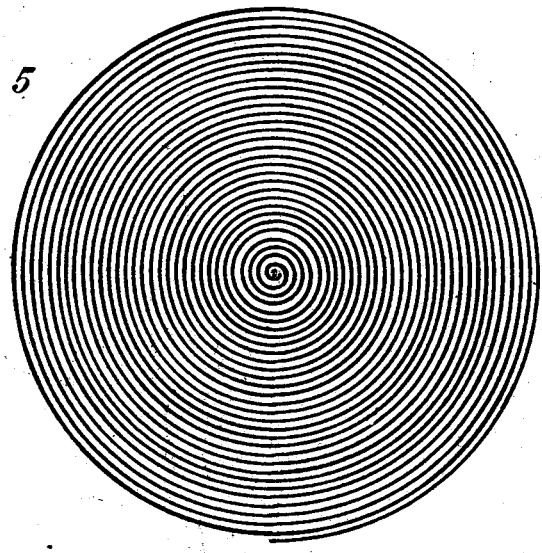
Figure 6:
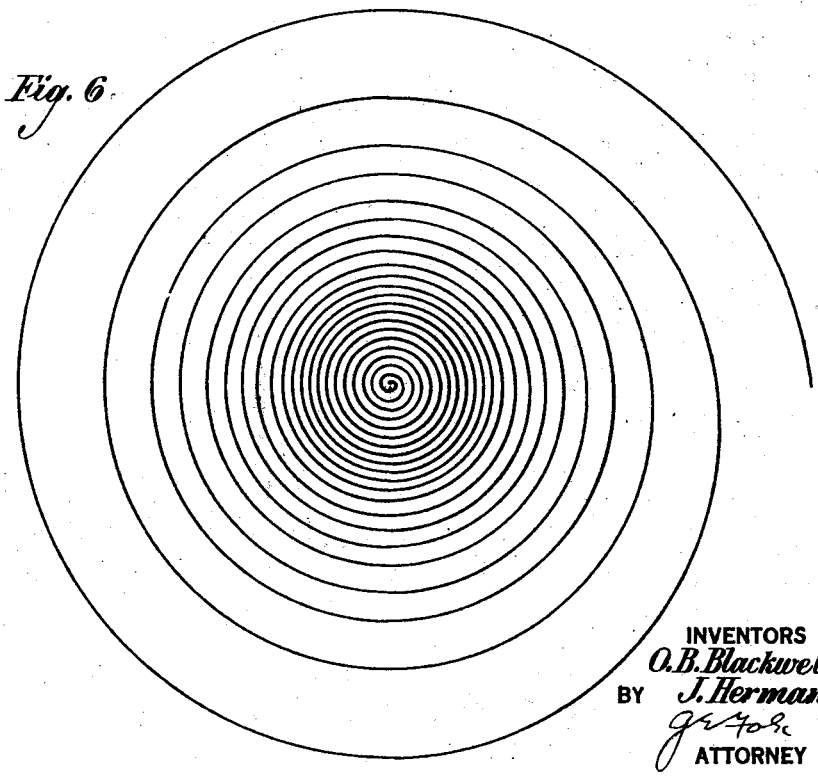

Referring to the drawings, Figure 1 is a diagram showing the transmitting end of apparatus for television that embodies our invention; Fig. 2 is a diagram for the corresponding receiving end; Fig. 3 is a detail showing how certain lenses are shifted in Figs. 1 and 2; Fig. 4 is a detail showing how a viewing or projecting orifice is formed and controlled to move over a spiral path in Figs. 1 and 2; and Figs. 5 and 6 are diagrams showing spiral viewing paths for a field of view.

At the transmitting end is the object 19, some part of which it is desired to view by an observer at the receiving end. For the present, the lens 20' may be thought of as stationary, although it is subject to a displacement that will be described later. The analyzer 23 of Fig. 1 comprises a disk 21 (Fig. 4) having a slot 35, and the adjacent smaller disk 34 pivoted on 21 at 21' has slots 36 so that the intersection of these slots 35 and 36 makes a small opening 25. The light that goes through this opening 25 comes from a small elemental area at 19' of the object 19, and this light, after passing through the opening 25, is focused by the lens 26 on the photoelectric cell 27.

The disk 21 rotates on its center, having annular flanges 18 supported by suitable guides. The rotation of the disk 21 is effected by the synchronous alternating current motor 25 through the engagement of the gear 24 with the gear teeth 22 around the rim of the disk 21.

The stationary internal gear wheel 28 has its teeth in engagement with the gear wheel 29 which turns on a spindle 30 carried by the disk 21. It will be seen that as the disk 21 rotates, the gear wheel 29 turns on its spindle 30 and turns with it the integral gear pinion 31 through which rotation is communicated by the idler 32 engaging the peripheral gear teeth 33 on the already mentioned auxiliary disk 34.

The gear system is such that the disk 34 turns comparatively slowly on its shaft 21' compared with the rotation of the disk 21 about its axis. Accordingly, the opening 25 formed by the intersection of the two slots 35 and 36 describes a spiral, and hence object 19 is scanned in a corresponding spiral fashion and the light from the successive elemental areas 19' of the object 19 in spiral order goes to the photoelectric cell 27. This spiral viewing path is shown in Fig. 5. The complete spiral referred to is traced in repetition about ten or more times per second so that the view will seem to be continuous to the observer.

The quantity of light falling on the photoelectric cell 27 determines a corresponding current to the input of the modulator 37, which is suppplied with current at frequency $f_1$ over the conductors 38. Accordingly, this current of frequency $f_1$ is modulated to correspond to the degree of light at the spot 19' of the object. The modulated current passes through the filter 39 and over the line 40 to the receiving station shown in Fig. 2.

The power current for the synchronous motor 25 may be an alternating current of 60 cycles per second. A current of frequency $f_2$ is supplied over the conductors 41 to the modulator 43 and is there modulated by the alternating current power supply on the conductors 42. The output goes through the filter 44 and is also put on the line 40 along with the current of frequency $f_1$ modulated according to the light in the photoelectric cell 27.

At the receiving end shown in Fig. 2 the modulated currents of basic frequencies $f_1$ and $f_2$ go respectively to the appropriately designed filters 45 and 48 and thence respectively to detectors 46 and 49, whose outputs accordingly carry currents corresponding to the modulating currents at the sending end. The amplifier 50 receives current of the same frequency as that supplied over the conductors 42 to the synchronous motor 25, and thus the amplified output current from the amplifier 50 drives the synchronous motor 25′ at the same speed as the motor 25, and the apparatus 23′ at the same speed as the apparatus 23. The device 23′ is a duplicate of 23, having an opening formed by the intersection of two slots, and this opening describes a spiral course, rapidly repeated in synchronism with the spiral already mentioned at the sending end.

Light from a determinate portion of the source 75 goes through the light valve 47 to the opening in the device 23′ and is focused by the lens 20 in a small spot on the screen 51. This spot describes a spiral, and at each point of the spiral the degree of illumination is determined by the light valve 47 in correspondence with the degree of illumination from a corresponding point 19′ of the object at the sending end. Since the spirals are repeated ten or more times per second, that is often enough to give the impression of continuity of vision, an observer looking at screen 51 sees an image of the object within the field of view at 19, and if there is motion in the object he sees the motion.

When a person views an object or objects having motion he ordinarily fixes his attention and directs his gaze on a small central region of his entire field of view and he sees this narrow region very distinctly, and all the outlying portion of his field of view is comprehended less distinctly. Moreover, when there is motion within the field of view the observer will be likely to shift the narrow region of closest attention according as the motions cause his interest or concern to change from one place to another. If an observer is looking through a telescope or field glasses at a moving object or objects he turns the direction of his instrument from time to time to correspond to the change in location of the regions on which he desires to fix his attention. We have provided that the observer looking at the screen 51 can shift his attention from part to part of the image of the object 19 in a manner somewhat analagous to that just described for a person who views an object directly through a telescope.

Immediately in front of the observer who is watching the screen 51 is a comparatively small square 52, which corresponds point for point with the screen 51. Within this square 52 is an imaginary circle 53 which corresponds to the illuminated area on the screen 51. As we have seen, the illuminated area on the screen 51 is due to a spot of light of varying intensity tracing a spiral course in rapid repetition.

In the center of this area 53 is a pointer 54 connected with two arms for the respective rheostats 57 and 58 which are insulated from each other. As will readily be seen, motion of the pointer to right or left leaves the rheostat 58 unchanged but varies rheostat 57, and motion of the pointer 54 up and down leaves 57 unchanged but varies 58, and motions in other directions affect both rheostats 57 and 58 according to the components in the two principal directions.

The rheostat terminals are supplied respectively with currents of frequencies $f_3$ and $f_4$ over the conductors 55 and 56, and the output currents on the conductors 59 and 60 are determined by the respective rheostats. These currents go to respective detectors 61 and 65, whose output currents are direct currents corresponding in magnitude to the currents from the rheostats 57 and 58. The output current from detector 61 goes to the movable coil 62 in the magnetic field produced by the direct current in the winding 63. The arm 64, carried by the movable coil 62 is connected to shift the lens 20 horizontally to right or left. This will be seen more readily in Fig. 3. In Fig. 2 (and likewise in Fig. 1) the coils referred to are turned to bring them into the plane of the diagram.

Similarly, the output current from the detector 65 goes to the moving coil 66 in the field energized by direct current in the winding 67, and this current from detector 65 determines the angular position of the arm 68 which is connected to the lens 20 so as to shift it up or down.

The currents of frequencies $f_3$ and $f_4$, determined in magnitude by the respective rheostats 57 and 58, also go by multiple branch circuits through the respective filters 69 and 70 to the line 40 and over it to the sending station shown in Fig 1, where they are separated by the filters 71 and 73 and go to the detectors 72 and 74. The outputs from these detectors are direct currents corresponding in magnitude to the output currents from the detectors 61 and 65, and hence it will be seen at once that the position of the lens 20' will be the same as for the lens 20.

Whenever the observer at the receiving end in Fig. 2 desires to shift his attention over the possible field of view represented by the square 52 he moves the pointer 54 accordingly. Thereupon he sees the illuminated area on the screen 51 shift in correspondence with keeping the circle 53 true to the pointer 54 as its center. At the same time the portion of the object 19 scanned by means of the lens 20 changes accordingly, and thus the observer in Fig. 2 is able to look at any portion he pleases of the object 19, and if there is motion in this object whose center of interest shifts to different parts, he can follow it to those different parts by shifting his pointer 54.

Referring to Fig. 4 it will be seen that the slot 35 rotates around its left hand end which lies on the axis of the disk 21. Assume that the intersection 25 of the two slots moves uniformly along the slot 35; it follows that the velocity of the intersection 25 along its path relatively to fixed objects varies as its distance from the center. The object is viewed along the spiral path of Fig. 5. The result is that those portions of the object 19 away from the center of the field of view are scanned with a rapidity that varies as their distance from the center. The portions near the center of the field of view being scanned slowly will be seen more sharply and distinctly while the portions more remote from the center of the field of view will be somewhat less distinct. This corresponds with actual vision in which objects are perceived with distinctness only as they lie close to the direct axis of vision.

By making the slots 35 and 36 both wedge shaped so that their intersection close to the center of the disk 21 is a small compact area and so that this area increases in both dimensions as the intersection recedes from the center of the disk 21, the result is secured that the elemental area scanned varies as the square of its distance from the center. The spiral path for this case is shown in Fig. 6. The wedge shapes should be modified at their central ends so that close to the center the elemental areas will be more nearly equal and scanned at a nearly uniform rate of succession. But away from the center the result is secured that the speed with which the area of the field of view is scanned varies as the square of the distance from the center, and it becomes possible thoroughly to scan a small region near the center of the field of view and yet to give a satisfactory idea of the outlying regions so that the view of the observer at the receiving end corresponds rather closely with actual vision, and moreover, the observer by means of the pointer 54 can get the thoroughness of view for any particular part of the object that he desires. By scanning the central part in small successive elemental areas, and the outlying parts in larger areas, it becomes possible repeatedly to scan the whole field of view often enough to get continuity of vision.

The current of frequency $f_1$ at the modulator 37 at the sending end is varied in amplitude irregularly corresponding to the light in the successive elemental areas 19' of the object scanned. Such an irregularly varying current may be resolved into components having a certain range of frequencies. The more abrupt the changes of amplitude, the greater the frequency range necessary for an approximate resolution into components each of single frequency.

For successful transmission the possible frequency range will be limited, and by our invention we show how best to utilize this limited frequency range. For a restricted area of the object viewed we deal with larger elements, thus keeping within a permissible frequency range we are able to scan the entire object repeatedly and often enough to get continuity of vision. If we viewed the whole object with the detail as at the center, we could not get over it often enough to get continuity of vision, and if we viewed it often enough for continuity of vision but with the same detail throughout, then we could not see distinctly the part of the view at which interest and attention are centered. By our method we utilize the available transmitting range frequency channel to the best advantage.

We claim:

1. The method of television which consists in scanning thoroughly the elements of an object close to the preferred part of a field of view thereof and scanning less thoroughly the outlying elements, repeating this cycle in rapid succession, transmitting electric current varied according to the degree of light of the successive elements, applying said current to determine the production of light in the elements of a field of view in the same degree and order whereby the view of the object will be reproduced as a whole with greatest distinctness in its preferred part, and varying the preferred part of the field of view scanned.

2. In combination, means to scan an object comparatively slowly close to the preferred part of a field of view thereof and more rapidly away from said part, means to vary an electric current in correspondence with the light from the elements of the object, means to apply such current to determine a corresponding degree of illumination in corresponding elements of a reproduced field of view, and means to vary the preferred part of the field to be scanned.

3. The method of television which consists in scanning the elements of an object successively over an expanding spiral course and scanning the elements close to the center of the spiral comparatively thoroughly and the outlying elements less thoroughly, repeating this cycle in rapid succession, transmitting electric current varied according to the degree of light of the successive elements, applying said current to reproduce the light in the same degree and order at the receiving end whereby the view will be reproduced as a whole and with a maximum of distinctness in its central part, and varying said scanning to reproduce the view with a maximum distinctness in other parts than the central part.

4. In combination, a photoelectric cell, a lens to focus light on said cell from an element of area of an object to be viewed, means to take the light from elements of the object in spiral order, the area traversed per unit of time being small near the center of the spiral and larger for outlying parts, means to vary an electric current according to the light on the cell, a screen, means to illuminate said screen with a spot of light moving in a spiral path in synchronism with the light from said element of area of the object viewed, means to determine the light on said moving spot according to said current whereby the object viewed will be reproduced on the screen with maximum thoroughness for its essential part near the center of the said spiral, and means to move said lens relatively to the object to correspondingly change the relative position of the spiral path of said light on said screen.

5. The method of television which consists in scanning an object in successive small elements in the preferred part of a field of view thereof and scanning larger elements in succession away from that part, repeating this cycle in rapid succession, transmitting electric current varied according to the degree of light of the successive elements, applying said current to determine the illumination of the elements of a screen in the same degree and order to reproduce the view of the object with maximum definition in the preferred part of the field of view, and varying said scanning to correspondingly vary the preferred part of the reproduced field of view.

6. The method of television which consists in scanning the elements of an object successively over an expanding spiral course with the elements taken larger and larger at increasing distances from the center, repeating this cycle in rapid succession, transmitting electric current varied according to the degree of light of the successive elements, applying said current to reproduce the light on the elements of a screen in the same degree and order, whereby the view will be reproduced as a whole and with a maximum of definition in its central part, and varying said scanning to produce maximum definition in outlying parts of the reproduced view.

7. In combination, two screens with intersecting wedge-shaped slots, means to move said screens so that the opening formed by their intersection will describe a spiral course increasing in area with increasing width of the slots away from the center of the spiral, a photoelectric cell, means to illuminate it by light transmitted through the intersecting part of the two said slots from successive elements of an object, means to vary an electric current according to the illumination of said cell, means to illuminate the elements of a screen as determined by said current to reproduce a view of said object, and means to vary the relative positions of said means and said object.

8. A photoelectric cell at a transmitting station, means to illuminate said cell in successive order repeatedly from the elements of an object within a certain field of view, means to modulate an electric current accordingly and send it to a receiving station, means there to apply such current to determine the illumination of the elements of a screen in degree and order the same as for the object at the transmitting station, and means controlled by an observer at the receiving station to shift said field of view relatively to said object.

9. The method of viewing an object by television which consists in transmitting electric currents corresponding to the light values in repeated order of the elements of a field of view of part of said object, thereby reproducing a view of that part at the station of the observer, and shifting this field of view from part to part of the object at the will of the said observer.

10. The method of viewing an object by television which consist in transmitting electric currents from the object to the observer corresponding to the light values in repeated order of the elements within a certain field of view of said object, thereby reproducing the view before the observer, and transmitting currents in the reverse direction as determined by adjustment by the observer to shift the field of view relatively to the object.

11. The method of viewing an object by television which consist in transmitting electric currents corresponding to the light values in repeated order of the elements of a field of view of part of the object, thereby reproducing a view of that part at the station of the observer, and shifting this field of view from part to part of the object as the center of interest in the object changes from part to part.

12. The method of viewing an object by television which consists in transmitting electric currents corresponding to the light values of the elements in repeated order of a field of view of part of the object, thereby reproducing a view of that part on a screen at the station of the observer, and shifting this field of view from part to part of the object and synchronously shifting its reproduction over corresponding parts of said screen.

13. The method of viewing an object by television which consists in scanning a portion thereof within a certain field of view with a degree of thoroughness greatest at and near the center of interest, transmitting electric currents as determined by the illumination of the elements scanned, applying these currents to determine a corresponding illumination on a screen to reproduce a view of the object within the field of view, and shifting the field of view from part to part of the object as the center of interest in the object changes.

14. The method of viewing an object by television which consists in scanning a portion thereof within a certain field of view with a degree of thoroughness greatest at and near the center of interest in that field of view, transmitting electric currents as determined by the illumination of the elements scanned, applying these currents to determine a corresponding illumination on a screen to reproduce a view of the object within the field of view, and shifting the field of view of the object and synchronously shifting its reproduction on said screen as the center of interest in the object changes from time to time.

15. A photoelectric cell, means to focus on it the light from an element of area of an object, means to shift the light from elements in order repeatedly over a part of said object, means to vary an electric current by the illumination of said cell, a screen, means to apply said current to illuminate a spot on the screen corresponding to the illumination from the object, means to shift the spot synchronously with the light from said elements of the object, and means to adjust the apparatus relatively to the object to get the light on the cell from any desired part of the object.

16. A photoelectric cell, means to focus on it the light from an element of area of an object, means to shift the light from elements in order repeatedly over a part of said object, means to vary an electric current by the illumination of said cell, a screen, means to apply said current to illuminate a spot on the screen corresponding to the illumination from the object, means to shift the spot synchronously with the said elements of the object, means to adjust the apparatus relatively to the object to get the light on the cell from any desired part of the object, and means synchronously to shift the view on the screen so it will correspond in location with the part of the object affecting the photoelectric cell.

17. The method of utilizing an available television transmission channel which consists in employing it in proportionally large part for sending any portion of the field of view in relatively great detail, and employing it in proportionally less part for sending the adjacent portion of the field of view in relatively less detail.

18. The method of television which comprises scanning an object and electrically reproducing an image thereof with maximum definition in the central portion and varying said scanning to reproduce the image with maximum definition in any desired portion.

19. In a television system, the combination of an object whose image is to be transmitted, a scanning device for resolving the light from said object into successive impulses, said device producing maximum resolution corresponding to the central zone of the object, and means for causing said device to produce maximum resolution corresponding to any desired zone of the object.

20. In a television system, the combination of an object whose image is to be transmitted, a set of scanning discs, a lens system for producing an image of said object on said discs, said lens system being normally positioned so that said scanning discs have maximum resolving power corresponding to the central portion of said image, means for producing and transmitting currents corresponding to the resolutions of successive areas of the image as determined by said disks, means for utilizing said currents to reproduce the image before an observer, and electromagnetic means controlled by the observer for altering the position of said lens so that said scanning discs have a maximum resolving power corresponding to any desired portion of said image.

21. In a television system, the combination of an object whose image is to be transmitted, a light translating device comprising scanning discs and a photo-electric cell, an optical system for producing an image of said object, on said discs, means for rotating said discs, and electromagnetic means controlled by a distant observer for altering the relative position of said object, of said lens system and of said translating device.

In testimony whereof, we have signed our names to this specification this 4th day of May 1925.

OTTO B. BLACKWELL.
JOSEPH HERMAN.